(12) United States Patent
Kamamoto et al.

(10) Patent No.: US 10,161,450 B2
(45) Date of Patent: Dec. 25, 2018

(54) BALL BEARING

(71) Applicant: JTEKT CORPORATION, Osaka-shi, Osaka (JP)

(72) Inventors: Shigeo Kamamoto, Kashiwara (JP); Junji Murata, Kashiba (JP); Yuki Shishihara, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/451,535

(22) Filed: Mar. 7, 2017

(65) Prior Publication Data

US 2017/0268570 A1    Sep. 21, 2017

(30) Foreign Application Priority Data

Mar. 15, 2016    (JP) .................. 2016-050495

(51) Int. Cl.
*F16C 19/06* (2006.01)
*F16C 33/38* (2006.01)

(52) U.S. Cl.
CPC .......... *F16C 33/3887* (2013.01); *F16C 19/06* (2013.01); *F16C 33/3806* (2013.01)

(58) Field of Classification Search
CPC .............. F16C 33/3806; F16C 33/3837; F16C 33/3843; F16C 33/3856; F16C 33/3887; F16C 33/412; F16C 33/414; F16C 33/416; F16C 33/418

See application file for complete search history.

(56) References Cited

U.S. PATENT DOCUMENTS

| | | | | |
|---|---|---|---|---|
| 2,360,419 | A * | 10/1944 | Hickling | F16C 33/414 384/534 |
| 8,944,693 | B2 * | 2/2015 | Katsuno | F16C 33/3856 384/531 |
| 9,011,016 | B2 * | 4/2015 | Adane | F16C 33/3887 384/531 |
| 2012/0183248 | A1 * | 7/2012 | Fujiwara | B22D 17/22 384/527 |
| 2017/0241476 | A1 * | 8/2017 | Moratz | F16C 33/3806 |

FOREIGN PATENT DOCUMENTS

| | | | |
|---|---|---|---|
| JP | 2508181 | * | 4/1988 |
| JP | 2008164094 | * | 12/2006 |
| JP | 4017827 | * | 12/2007 |
| JP | 2008008411 | * | 1/2008 |
| JP | 2014-070669 A | | 4/2014 |

* cited by examiner

*Primary Examiner* — James Pilkington
(74) *Attorney, Agent, or Firm* — Oliff PLC

(57) ABSTRACT

A cage has an annular portion positioned on an axially first side of balls and a plurality of cage bars provided to extend from the annular portion toward an axially second side. Pockets each housing a corresponding one of the balls correspond to areas each located on the axially second side of the annular portion and between two cage bars adjacent to each other in a circumferential direction. Each of the balls is exposed from axially-second-side ends of the corresponding cage bars over an axially-second-side range. An axial dimension of the range over which the ball is exposed from the axially-second-side ends is 30% or more and 50% or less of the diameter of the ball.

9 Claims, 8 Drawing Sheets

BALL BEARING

INCORPORATION BY REFERENCE

The disclosure of Japanese Patent Application No. 2016-050495 filed on Mar. 15, 2016 including the specification, drawings and abstract, is incorporated herein by reference in its entirety.

BACKGROUND OF THE INVENTION

1. Field of the Invention

The invention relates to a ball bearing.

2. Description of the Related Art

Ball bearings are subjected to a lower torque (lower rotational resistance) than roller bearings such as tapered roller bearings. However, in recent years, there has been a demand for a further reduction in the torque exerted on the ball bearing. The ball bearing has an inner ring, an outer ring, a plurality of balls, and an annular cage. The cage functions as a separator that separates the balls provided between the inner ring and the outer ring from one another. The cage reduces the rotational resistance to the bearing and restrains the balls from being worn away.

As depicted in FIG. 8, a cage 90 for a ball bearing has an annular portion 91 and a plurality of cage bars 92. The annular portion 91 is provided on an axially first side of balls 93. The cage bars 92 are provided so as to extend from the annular portion 91 toward an axially second side. Pockets 94 in which the balls 93 are housed correspond to areas each located on the axially second side of the annular portion 91 and between a pair of the cage bars 92, 92 adjacent to each other in a circumferential direction.

Conventional ball bearings adopt a configuration referred to as a rolling element guide and in which the cage 90 is guided by the balls 93. In other words, the cage 90 is positioned by the balls 93. To implement the rolling element guide, each of the pockets 94 has a pocket surface 95 shaped along a virtual spherical surface having a slightly larger diameter than each of the balls 93. To prevent the cage 90 from coming off, each of the cage bars 92 has a pawl portion 97 that further protrudes toward the axially second side. An inner surface 96 of each of the pawl portions 97 is included in the pocket surface 95, shaped along the spherical surface. (See Japanese Patent Application Publication No. 2014-70669 (JP 2014-70669 A).

In order to allow the rolling element guide configuration to be adopted, the cage 90 needs to encase the balls 93. To achieve this, each pocket surface 95 is shaped along the virtual spherical surface having a slightly larger diameter than the corresponding ball 93 as described above. The pawl portions 97 protrude far from the respective cage bars 92 toward the axially second side. This configuration results in an increased size of the cage 90 and an increased area of each pocket surface 95 facing the corresponding ball 93.

Rotation of the ball bearing causes shearing of grease present between each ball 93 and the corresponding pocket surface 95 and around the ball 93 and the pocket surface 95. An increased area of the pocket surface 95 facing the ball 93 as described above leads to an increase in resistance resulting from the shearing (shearing resistance). Thus, disadvantageously, the ball bearing involves high rotational resistance (running torque) and a reduced lifetime of the grease.

SUMMARY OF THE INVENTION

An object of the invention is to reduce rotational resistance in a ball bearing by reducing, as much as possible, shearing of grease provided in an annular space formed between an inner ring and an outer ring.

A ball bearing in an aspect of the invention has an inner ring with an inner raceway groove formed in an outer periphery of the inner ring, an outer ring with an outer raceway groove formed in an inner periphery of the outer ring, a plurality of balls interposed between the inner raceway groove and the outer raceway groove, and an annular cage that holds the balls. The cage has an annular portion positioned on an axially first side of the balls and a plurality of cage bars extending from the annular portion toward an axially second side. Pockets each housing a corresponding one of the balls correspond to areas each located on the axially second side of the annular portion and between a pair of the cage bars adjacent to each other in a circumferential direction. Each of the balls is exposed from axially-second-side ends of the corresponding cage bars over an axially-second-side range. An axial dimension of the range over which the ball is exposed from the axially-second-side ends is 30% or more and 50% or less of a diameter of the ball.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
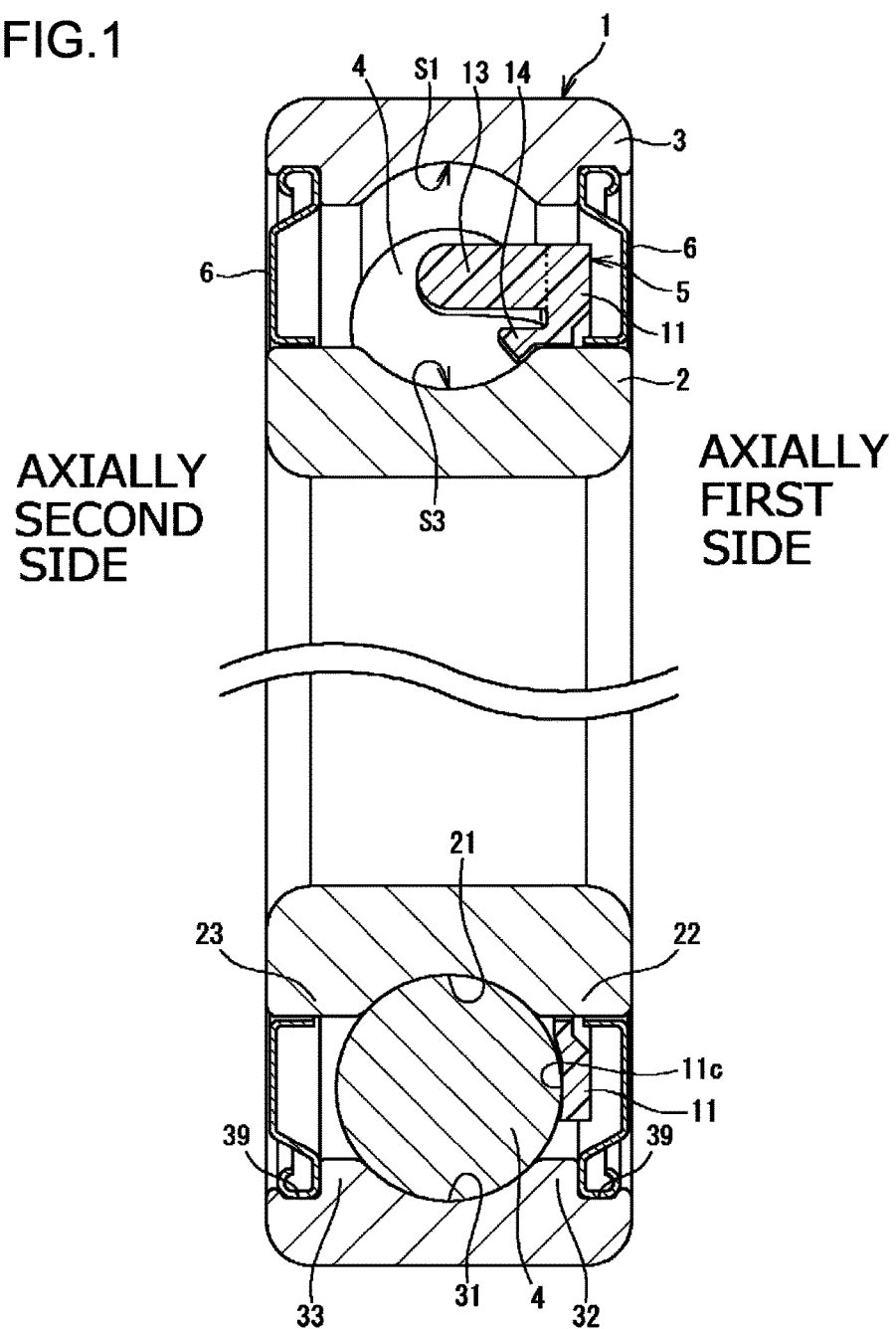
FIG. 1 is a sectional view depicting an embodiment of a ball bearing in the invention.

An embodiment of the invention will be described below. FIG. 1 is a sectional view depicting an embodiment of ball bearing in the invention. A ball bearing 1 includes an inner ring 2, an outer ring 3, a plurality of balls 4, and an annular cage 5. The outer ring 3 is provided outward of the inner ring 2 in a radial direction. The balls 4 are interposed between the inner ring 2 and the outer ring 3. The cage 5 holds the balls 4.

The ball bearing 1 depicted in FIG. 1 further includes sealing apparatuses 6 at opposite ends of the ball bearing 1 in an axial direction. The sealing apparatuses 6 prevent grease in a bearing interior where the balls 4 and the cage 5 are provided from leaking to the outside. The sealing apparatuses 6 also have a function to prevent external foreign matters from entering the bearing interior.

The inner ring 2 is an annular member and has an inner raceway groove 21 formed in an outer periphery of the inner ring 2 and through which the balls 4 roll. In a longitudinal section depicted in FIG. 1, the inner raceway groove 21 is shaped like a recessed circular arc having a slightly larger radius than each of the balls 4. The inner ring 2 has a first shoulder portion 22 on an axially first side of the inner raceway groove 21 and a second shoulder portion 23 on an axially second side of the inner raceway groove 21.

The outer ring 3 is an annular member and has an outer raceway groove 31 formed in an inner periphery of the outer ring 3 and through which the balls 4 roll. In the longitudinal section depicted in FIG. 1, the outer raceway groove 31 is shaped like a recessed circular arc having a slightly larger radius than each of the balls 4. The outer ring 3 has a first shoulder portion 32 on an axially first side of the outer raceway groove 31 and a second shoulder portion 33 on an axially second side of the outer raceway groove 31. Recessed grooves 39 are formed in an inner peripheral surface of the outer ring 3 at opposite ends of the outer ring 3 in the axial direction. The sealing apparatuses 6 are attached to the respective recessed grooves 39. The ball bearing 1 in the present embodiment is a deep groove ball bearing.

The balls 4 are arranged between the inner raceway groove 21 and the outer raceway groove 31. Rotation of the ball bearing 1 (inner ring 2) allows the balls 4 to roll through the inner raceway groove 21 and the outer raceway groove 31. Each of the balls 4 contacts the inner raceway groove 21 at the deepest point thereof (area S3) and contacts the outer raceway groove 31 at the deepest point thereof (area S1). The balls 4 are members formed of steel such as bearing steel. The inner ring 2 and the outer ring 3 are formed of steel such as bearing steel or steel for mechanical structures.

Figure 2:
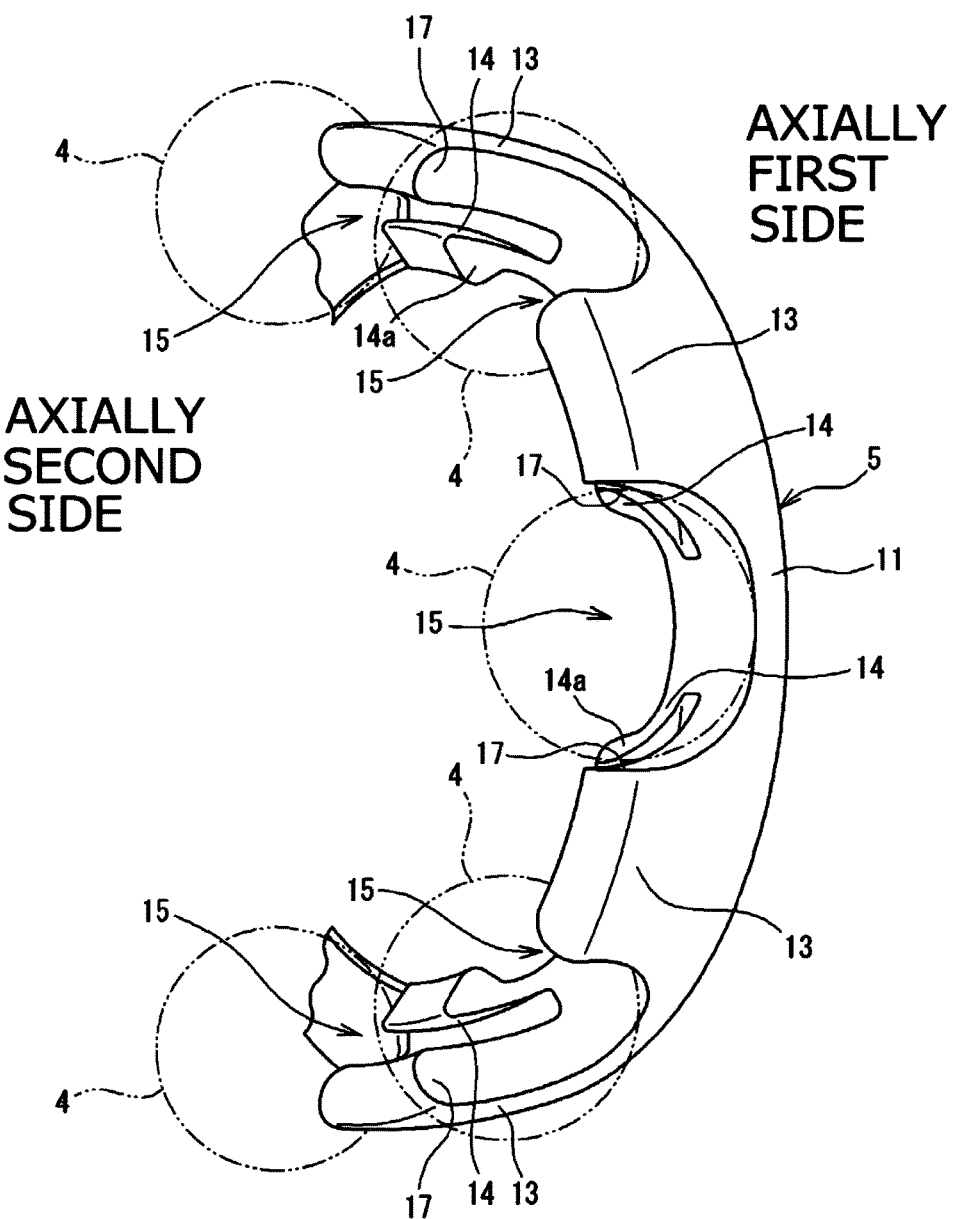
FIG. 2 is a perspective view depicting a part of a cage.

FIG. 2 is a perspective view depicting a part of the cage 5. The cage 5 has an annular portion 11 and a plurality of cage bars 13, and is what is called a snap cage. The annular portion 11 is positioned on the axially first side of the balls 4. The cage bars 13 are provided so as to extend from the annular portion 11 toward the axially second side. The cage 5 has a plurality of guide portions 14 provided so as to extend from the annular portion 11 toward the axially second side. The annular portion 11 is shaped like a circular ring and positioned between the shoulder portion 22 of the inner ring 2 (see FIG. 1) and the shoulder portion 32 of the outer ring 3. All the cage bars 13 have the same shape. All the guide portions 14 also have the same shape. Each of the guide portions 14 is provided inward of the corresponding cage bar 13 in the radial direction. The cage 5 is formed of resin (synthetic resin) and manufactured by injection molding. The annular portion 11, the cage bars 13, and the guide portions 14 are integrated together, and the cage 5 is formed of a single member.

Pockets 15 each housing a corresponding one of the balls 4 correspond to areas each located on the axially second side of the annular portion 11 and between two cage bars 13, 13 adjacent to each other in a circumferential direction. The pockets 15 are open on the axially second side. The pockets 15 are formed along the circumferential direction. The cage 5 can hold the balls 4 at intervals in the circumferential direction.

The sealing apparatuses 6 depicted in FIG. 1 are annular shield plates attached to the outer ring 3 by fitting outer peripheral portions (radially outer portions) of the annular shield plates into the recessed grooves 39. Inner peripheral portions (radially inner portions) of the sealing apparatuses 6 face the inner ring 2 (shoulder portions 22, 23) via clearances and form a labyrinth seal. Although not depicted in the drawings, each of the sealing apparatuses 6 may be a seal having an annular core and a rubber member having a lip portion fixed to the core and coming into slidable contact with the inner ring 2.

Figure 3:
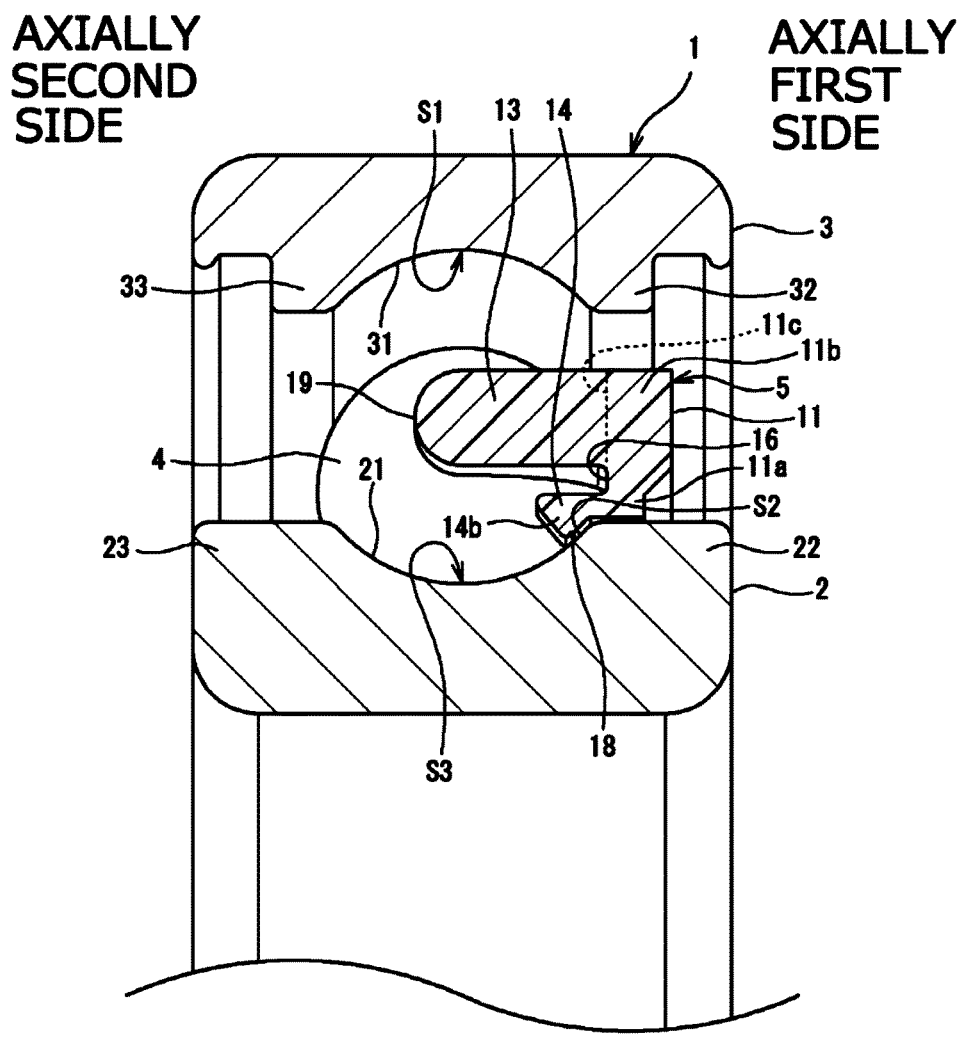
FIG. 3 is a sectional view of an inner ring, an outer ring, and the cage.

FIG. 3 is a sectional view of the inner ring 2, the outer ring 3, and the cage 5. In FIG. 3, the sealing apparatuses 6 are removed. The cage 5 includes the annular portion 11, the cage bars 13, and the guide portions 14 as described above. As depicted in FIGS. 2 and 3, the cage bars 13 are brought into contact with the balls 4. The guide portions 14 are brought into contact with the inner raceway groove 21.

As depicted in FIG. 3, the cage bars 13 linearly extend from a radially outer portion 11b of the annular portion 11 toward the axially second side. The guide portions 14 extend from a radially inner portion 11a of the annular portion 11 toward the axially second side. Although not depicted in FIG. 3, each of the guide portions 14 may be configured to branch from an axially first side portion (base portion) of the corresponding cage bar 13 and to protrude inward in the radial direction. As depicted in FIG. 3, the guide portion 14 has a protruding portion 14b protruding inward in the radial direction toward the inner raceway groove 21. A cutout portion 16 is formed between the guide portion 14 and the corresponding cage bar 13. The cutout portion 16 is formed by cutting out the cage bar 13 such that the cage bar 13 is partly recessed in section.

Figure 4:
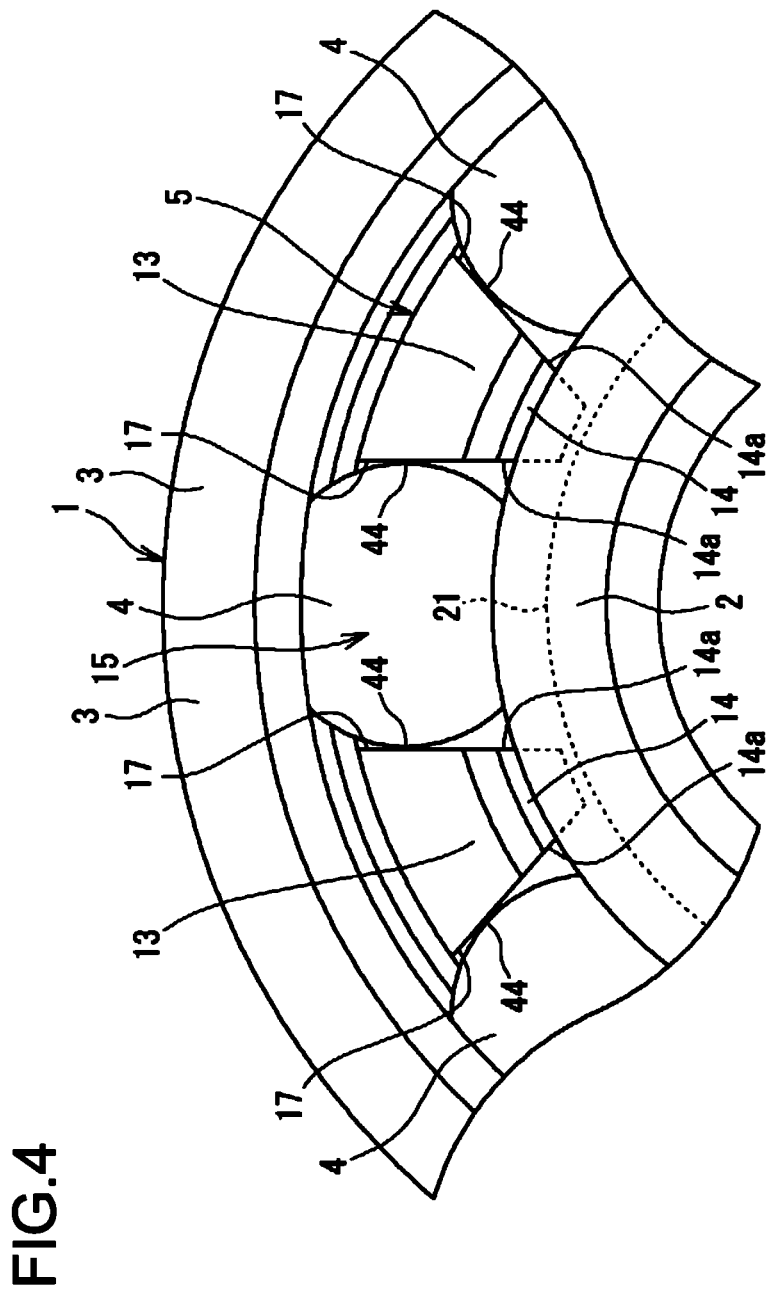
FIG. 4 is a diagram of a part of each of the inner ring, the outer ring, a ball, and the cage as viewed in an axial direction.
Figure 5:
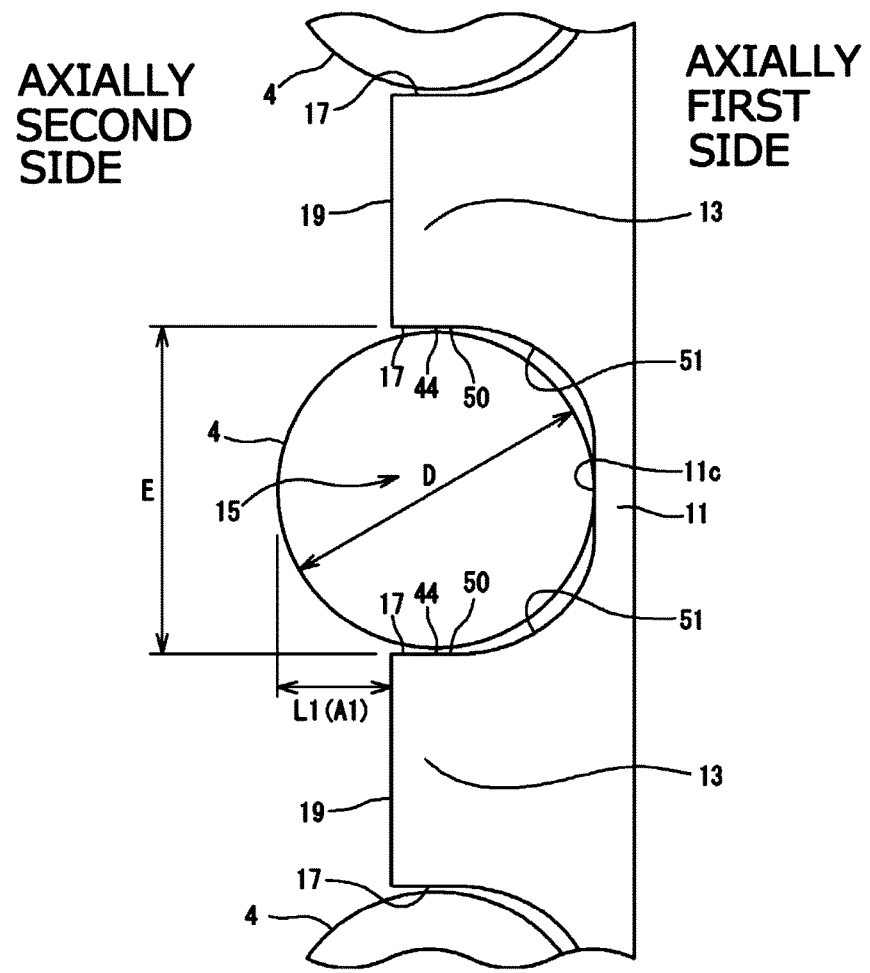
FIG. 5 is a diagram illustrating the cage with the ball housed in a pocket as viewed from an outer side in a radial direction.

FIG. 4 is a diagram of a part of each of the inner ring 2, the outer ring 3, the ball 4, and the cage 5 as viewed in the axial direction. FIG. 5 is a diagram illustrating the cage 5 with the balls 4 housed in the pockets 15 as viewed from an outer side in the radial direction. Each of the pockets 15 is open on the axially second side (see FIG. 5) and has a pair of flat surfaces 17, 17 in an opening area on the axially second side. The flat surfaces 17, 17 face each other in the circumferential direction such that a distance E between the flat surfaces 17, 17 is slightly longer than a diameter D of the ball 4. On each of the flat surfaces 17, a point (contact point) 44 is present where the ball 4 comes into contact with the pocket 15 after relatively moving closer to the pocket 15 in the circumferential direction. In FIG. 4 and FIG. 5, the point (contact point) where the ball 4 can contact the flat surface 17 is denoted by reference numeral 44. As depicted in FIG. 4, each flat surface 17 is formed such that the distance between the flat surface 17 and the ball 4 increases from the contact point 44 toward the inner ring 2. The pocket 15 has a ball 4-side surface 11c (see FIG. 5) included in the annular portion 11 and a circular arc surface 51 located between the surface 11c and the flat surface 17. On extended lines of the pocket surfaces 17 of each body portion 13, side surfaces 14a of the corresponding guide portion 14 are positioned. Each side surface 14a is included in part of the corresponding pocket 15, but the side surface 14a is not in contact with the corresponding ball 4.

The guide portions 14 allow the cage 5 to be positioned in the radial direction. In other words, when the inner ring 2 and the cage 5 are concentrically arranged, a part of each of the guide portions 14 is located to face the inner raceway groove via a clearance, as depicted in FIG. 3. However, the cage 5 is displaced in the radial direction to enable a part of each guide portion 14 (contact portion 18) to come into contact with the inner raceway groove 21 in the radial direction. In particular, the guide portion 14 contacts a non-contact area S2 of the inner raceway groove 21 that is other than an area S3 of the inner raceway groove 21 contacted by the balls 4 (hereinafter referred to as a contact area S3). The guide portion 14 contacts the non-contact area S2 of the inner raceway groove 21 only at one point. The non-contact area S2 is located closer to the shoulder portion 22 than the area S3 contacted by the balls 4. The contact area S3 is an area contacted by the balls 4 while no portion of the bearing is subjected to an axial load. The non-contact area S2 is an area not contacted by the balls 4 while no portion of the bearing is subjected to an axial load. The state where no portion of the bearing is subjected to an axial load is a state where an axial center of the outer raceway groove 31, an axial center of the inner raceway groove 21, and the respective centers of the balls 4 are each positioned on a plane orthogonal to a centerline of the ball bearing 1. This configuration allows the guide portions 14 to position the cage 5 in the radial direction. A portion of the guide portion 14 that contacts the inner raceway groove 21 is referred to as the contact portion 18.

The inner raceway groove 21 is shaped like a recessed circular arc. A part (including the contact portion 18) of each guide portion 14 is positioned in the inner raceway groove 21. Thus, displacement of the cage 5 toward the axially first side enables a part (contact portion 18) of the guide portion 14 to come into contact with the inner raceway groove 21 (non-contact area S2) in the axial direction. Consequently, the guide portions 14 regulate movement of the cage 5 toward the axially first side to allow positioning of the cage 5. Displacement of the cage 5 toward the axially second side enables the ball 4-side surface 11c of the annular portion 11 (see FIG. 1) of the cage 5 to come into contact with the balls 4 in the axial direction. Consequently, the annular portion 11 regulates movement of the cage 5 toward the axially second side to allow positioning of the cage 5. The surface 11c of the annular portion 11 is also included in the pocket 15.

Figure 6:
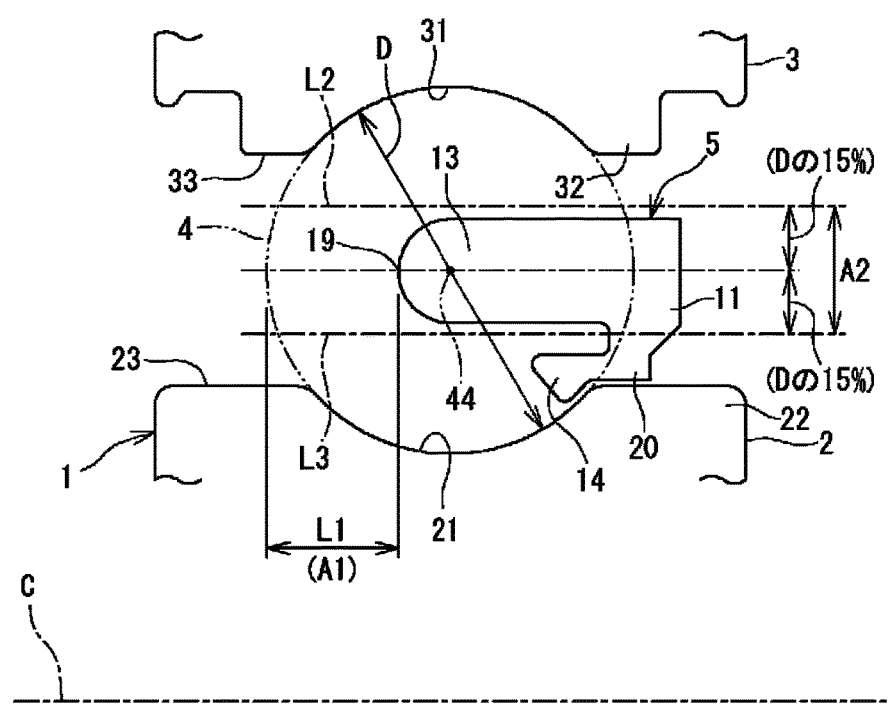
FIG. 6 is a diagram illustrating the shape of the cage and a periphery thereof in a section including a centerline of the bearing.

FIG. 6 is a diagram illustrating the shape of the cage 5 and a periphery thereof in a section including a centerline C of the ball bearing 1. FIG. 6 depicts, by a virtual line (long dashed double-short dashed line), the ball 4 based on the assumption that the above-described section includes the center of the ball 4. As depicted in FIG. 5 and FIG. 6, the ball 4 is exposed over an axially-second-side range A1 from axially-second-side ends 19 of the corresponding cage bars 13 of the cage 5. An axial dimension L1 of the range A1 over which the ball 4 is exposed from the ends 19 is 30% or more and 50% or less of the diameter D of the ball 4 (D×30/100≤L1≤D×50/100). The configuration in which the axial dimension L1 is 30% or more and 50% or less of the diameter D of the ball 4 is based on a state where the ball 4 is housed in the pocket 15 at a regular position (in other words, a state where the ball 4 and the pocket 15 are arranged so as to form a clearance between the ball 4 and the pocket 15 in accordance with design values). In this state, the center of the ball 4 coincides with the center of the pocket 15. The range A1 over which the ball 4 is exposed from the ends 19 of the cage 5 is wider than the range in the related art.

The ball bearing 1 configured as described above has a reduced range (narrower range) over which the cage 5 holds the balls 4 in the axial direction. This allows possible shearing of grease between each ball 4 and the cage 5 to be reduced as much as possible. As a result, when the ball bearing 1 rotates, resistance resulting from shearing of grease can be suppressed. Consequently, rotational resistance (running torque) of the ball bearing 1 can be reduced. The axial dimension L1 may be 35% or more of the diameter D of the ball 4. In this case, shearing of the grease can be more effectively reduced. When the axial dimension L1 of the range A1 over which the ball 4 is exposed is less than 30% of the diameter D of the ball 4, the effect of reducing shearing of the grease deteriorates, and the resistance resulting from the shearing is equivalent to the resistance in the related art. An axial dimension L1 of more than 50% of the diameter D of the ball 4 undesirably causes a force slipping the cage 5 from the balls 4 to act on the cage 5.

As depicted in FIG. 6, the cage bars 13 do not extend more than 15% of the diameter of the balls 4 from their respective points of contact 44 with the balls 4 on neither the outer ring 3 side nor the inner ring 2 side. The range between a virtual line L2 and a virtual line L3 is represented as "A2" in FIG. 6; the virtual line L2 is positioned on the outer ring 3 side (radially outer side) at a distance of 15% of the diameter D of the ball 4 with respect to the contact points 44 of the cage bars 13 (flat surfaces 17) contacted by the ball 4, and the virtual line L3 is positioned on the inner ring 2 side (radially inner side) at a distance of 15% of the diameter D of the ball 4 with respect to the contact points 44. The cage bars 13 are present within the range A2. This configuration is also based on the state where the ball 4 is housed in the pocket 15 at the regular position. The configuration increases the range over which the balls 4 are exposed from the cage 5 (cage bars 13) in the radial direction compared to conventional configurations. The present configuration also reduces the range over which the cage 5 holds the balls 4 in the radial direction. Consequently, the resistance resulting from shearing of the grease can be more effectively suppressed. This allows for contribution to a reduction in rotational resistance to the ball bearing 1.

As described above, the cage bars 13 have reduced dimensions in the axial direction and in the radial direction, enabling the cage 5 including the cage bars 13 to be made smaller (than conventional cages). The smaller cage 5 reduces the size of an area between the inner ring 2 and the outer ring 3 and where the grease is stirred by the cage 5, enabling a reduction in torque. The smaller cage 5 enables a reduction in weight and cost. In the present embodiment, the balls 4 can come into point contact with the cage bars 13 (flat surfaces 17). This further reduces the contact area between each ball 4 and the cage 5, allowing the resistance resulting from shearing of the grease to be suppressed.

The present embodiment is configured such that the guide portions 14 of the cage 5 contact a part (inner raceway groove 21) of the inner ring 2 to allow positioning of the cage 5. In other words, the cage 5 is guided by the inner ring 2. Thus, even with a narrow range over which the cage 5 holds the balls 4, the cage 5 can be prevented from coming off from the balls 4 interposed between the inner ring 2 and the outer ring 3 as described above.

The guide portions 14 are configured to contact the inner raceway groove 21. Thus, the cage 5 as a whole can be provided closer to the inner ring 2. This enables a reduction in the resistance resulting from shearing of the grease performed by the cage 5. That is, rotation of the ball bearing 1 makes the grease present in the annular space formed between the inner ring 2 and the outer ring 3 likely to be collected on the outer ring 3 side due to a centrifugal force. Thus, providing the cage 5 closer to the inner ring 2 makes the cage 5 less likely to shear the grease, enabling a reduction in the resistance resulting from shearing of the grease.

The cage 5 is guided by the inner ring 2 as described above, reducing the possibility that each pocket 15 and the corresponding ball 4 come off from each other. Thus, in the pocket 15 (see FIG. 5), the area between the flat surfaces 17, 17, which faces each other in the circumferential direction, serves as an opening. The opening (a distance E between the flat surfaces 17, 17) may be larger than the diameter D of the ball 4. This allows enhancement of a function to suppress the resistance resulting from shearing of the grease between each ball 4 and the cage 5 (the opening side of the corresponding pocket 15).

In assembly of the ball bearing 1, first, all of the balls 4 are placed between the inner ring 2 and the outer ring 3. Then, the cage 5 is moved closer to the balls 4 from the axially first side, and the balls 4 and the cage 5 are assembled together. Subsequently, grease is injected into the bearing interior, and the sealing apparatuses 6 (see FIG. 1) are attached to the outer ring 3. In this case, the opening (the distance E between the flat surfaces 17, 17) of each pocket 15 is larger than the diameter D of the corresponding ball 4 as described above. Consequently, during assembly of the cage 5, an operation of housing the balls 4 in the pockets 15 is facilitated.

Figure 7:
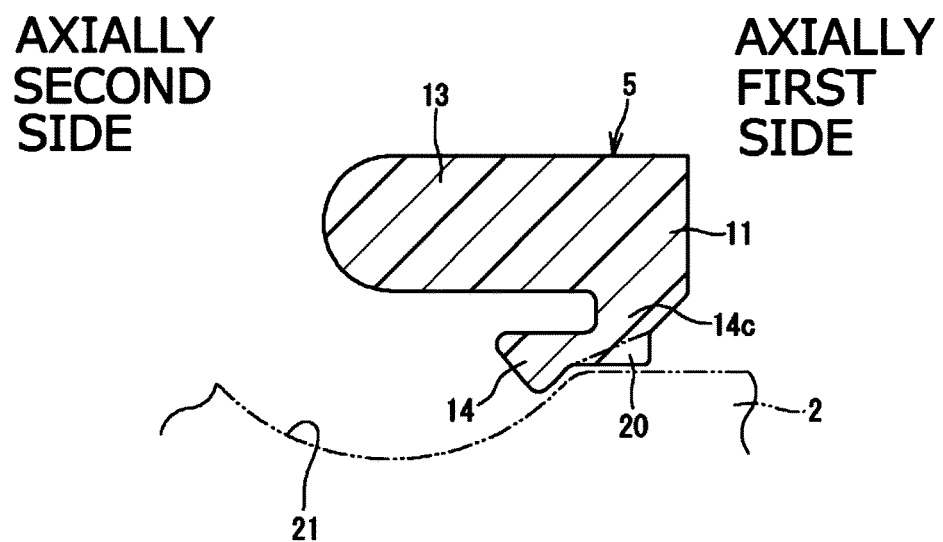
FIG. 7 is a sectional view of the cage.
Figure 8:
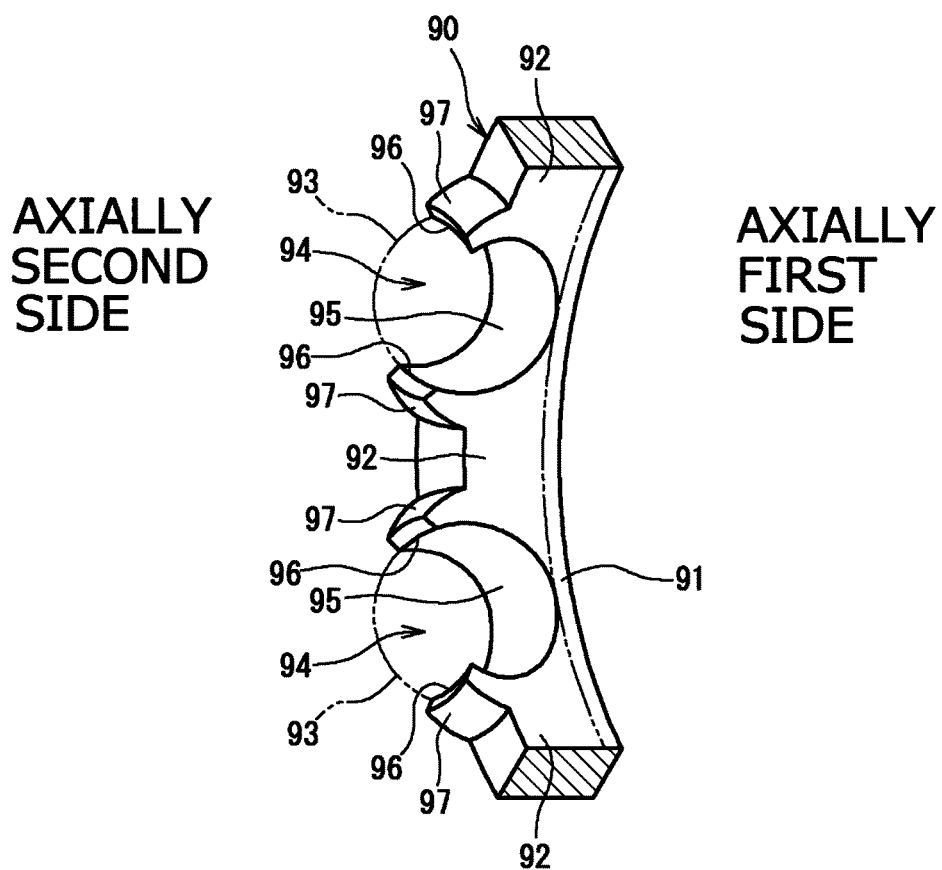
FIG. 8 is a perspective view depicting a cage of a conventional ball bearing.

FIG. 7 is a sectional view of the cage 5. As depicted in FIG. 7, the cage 5 has reinforcing portions 20 that reinforce the cage 5. The reinforcing portions 20 reinforce particularly the guide portions 14. The guide portions 14 are configured to branch from the annular portion 11 or from the cage bars 13. Each of the guide portions 14 has a smaller thickness (smaller radial dimension) and a lower rigidity than each of the cage bars 13. Thus, in the present embodiment, the reinforcing portions 20 are each provided at a base portion 14c of the corresponding guide portion 14. In FIG. 7, a long dashed double-short dashed line represents a contour line of the base portion 14c formed by extending the guide portion 14 straight from the annular portion 11 toward the inner raceway groove 21. In other words, the form illustrated by the long dashed double-short dashed line represents a case where the reinforcing portion 20 is not provided. Each of the reinforcing portions 20 bulges from the base portion 14c of the corresponding guide portion 14 toward the inner ring 2 and toward the axially first side. The thus bulged portion provides the guide portion 14 with an increased section modulus and an increased rigidity. Assembly of the cage 5 between the inner ring 2 and the outer ring 3 needs elastic deformation of the guide portions 14. In this case, when the guide portions 14 have a low rigidity, the base portion 14c may be damaged during assembly of the cage 5. However, such damage can be prevented by providing the reinforcing portions 20 as in the present embodiment.

In the above-described embodiment, the cage 5 is positioned by the inner ring 2. However, the ball bearing may be configured such that the cage 5 is positioned by the outer ring 3. In this case, although not depicted in the drawings, the guide portions 14 may be provided closer to the outer ring 3 than the cage bars 13. In other words, as seen in FIG. 1, the guide portions 14 of the cage bars 13 contact a non-contact area of the outer raceway groove 31 that is other than the area S1 contacted by the balls 4 (hereinafter referred to as a contact area S1). This allows the cage 5 to be positioned. The contact area S1 is an area contacted by the balls 4 while no portion of the bearing is subjected to an axial load. The non-contact area is an area not contacted by the balls 4 while no portion of the bearing is subjected to an axial load. The state where no portion of the bearing is subjected to an axial load is the state where the axial center of the outer raceway groove 31, the axial center of the inner raceway groove 21, and the respective centers of the balls 4 are positioned on the plane orthogonal to the centerline of the ball bearing 1.

The embodiment disclosed above is illustrative in every way and is not restrictive. In other words, the ball bearing in the invention is not limited to the illustrated form but may be in any other form within the scope of the invention. In the above-described embodiment, the ball bearing is a deep groove ball bearing. However, the invention is applicable to an angular contact ball bearing.

In the invention, shearing of the grease between each ball and the cage can be reduced as much as possible. As a result, the resistance resulting from the shearing is suppressed, enabling a reduction in the rotational resistance to the ball bearing.

What is claimed is:

1. A ball bearing comprising:
   an inner ring with an inner raceway groove formed in an outer periphery of the inner ring;
   an outer ring with an outer raceway groove formed in an inner periphery of the outer ring;
   a plurality of balls interposed between the inner raceway groove and the outer raceway groove; and
   an annular cage that holds the balls,
   wherein:
   the cage has an annular portion positioned on an axially first side of the cage and a plurality of cage bars extending from the annular portion toward an axially second side of the cage, and pockets each housing a corresponding one of the balls correspond to areas each located on the axially second side of the cage and between a pair of the cage bars adjacent to each other in a circumferential direction,
   the cage comprises a guide portion that comes into contact with one of the inner raceway groove and the outer raceway groove, and a cutout portion that is formed between the guide portion and the corresponding cage bar,
   the guide portion comprises a bulged portion that protrudes from a base of the guide portion toward a shoulder of one of the inner ring and the outer ring, and toward the axially first side of the cage,
   the cage, including the annular portion, the plurality of cage bars, and the guide portion, is formed of a single member, and
   each of the balls is exposed from axially-second-side ends of the corresponding cage bars over an axially-second-side range, and an axial dimension of the range over which the ball is exposed from the axially-second-side ends is 30% or more and 50% or less of a diameter of the ball.

2. The ball bearing according to claim 1, wherein the guide portion comes into contact with the inner raceway groove.

3. The ball bearing according to claim 2, wherein each of the pockets is open on the axially second side of the cage, and has a pair of flat surfaces provided in an opening area on the axially second side of the cage so as to face each other in a circumferential direction such that a distance between the flat surfaces is larger than a diameter of each of the balls.

4. The ball bearing according to claim 2, wherein the cage bars are allowed to come into point contact with the corresponding balls.

5. The ball bearing according to claim 4, wherein the cage bars do not extend more than 15% of the diameter of the balls from their respective points of contact with the balls on neither a radially outer side nor a radially inner side.

6. The ball bearing according to claim 1, wherein each of the pockets is open on the axially second side of the cage, and has a pair of flat surfaces provided in an opening area on the axially second side of the cage so as to face each other in a circumferential direction such that a distance between the flat surfaces is larger than a diameter of each of the balls.

7. The ball bearing according to claim 1, wherein the cage bars are allowed to come into point contact with the corresponding balls.

8. The ball bearing according to claim 7, wherein the cage bars do not extend more than 15% of the diameter of the balls from their respective points of contact with the balls on neither a radially outer side nor a radially inner side.

9. The ball bearing according to claim 1, further comprising annular shield plates attached to the outer ring.

* * * * *